Nov. 28, 1950 — L. H. ABRAHAMS — 2,531,594
PACKAGED COFFEE
Filed Aug. 23, 1949
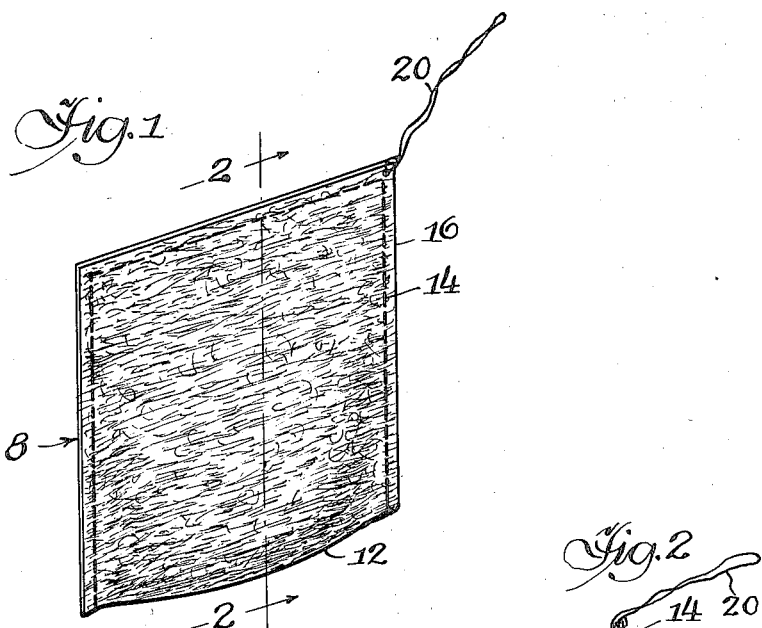
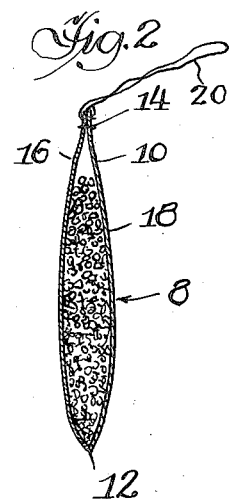
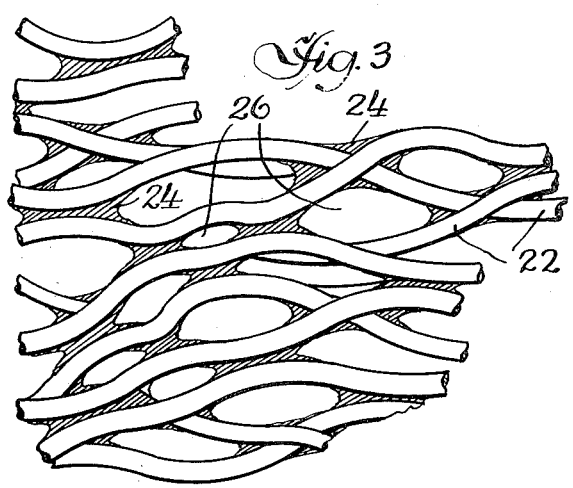
Inventor
Leon H. Abrahams
By Schneider & Dressler,
Attys.

UNITED STATES PATENT OFFICE 2,531,594

PACKAGED COFFEE

Leon H. Abrahams, Chicago, Ill., assignor to Koffy-Pak Corp., Chicago, Ill., a corporation of Illinois Application August 23, 1949, Serial No. 111,803

9 Claims. (Cl. 99—77.1)

This invention relates to an article of manufacture employed in the brewing of coffee. More particularly the invention relates to a small bag of ground coffee, similar to the type now commonly employed in brewing tea, which may be steeped in hot water to produce liquid coffee having an aroma and taste comparable to that obtainable by the best of the so-called "coffeemakers."

The device commonly known as the "tea bag" has long been in common use for the brewing of individual cups of tea. However, in the past, attempts to provide a similar device for the brewing of coffee have been relatively unsuccessful. Brewing of coffee with these coffee bags either has required such an excessive time as to make the device impractical, or has resulted in escape of the coffee grounds into the liquid, thus making an unpalatable and undesirable beverage. Such bags are commonly made of cotton and other fibrous materials, usually woven, and it has been found that diminution of the size of the mesh openings in the bag to the point where the undesirable coffee grounds within the bag will not escape into the surrounding hot water will so increase the brewing time of the beverage that the device becomes impractical.

I have found that the difficulty with the coffee bags of the prior art is that the mesh openings or pores of the prior art bags do not remain constant in size and configuration under the action of the hot water. If the meshes or pores of the prior art bags are made sufficiently small so that the undesirable grounds cannot escape into the surrounding water, the pores become so distorted by the action of the hot water that the desirable essential oils and aroma constituents of the coffee can no longer escape from the bag except by impractically long immersion. If, on the other hand, the meshes or pores are made sufficiently large so that after swelling and deformation of the fibers of the fabric by the action of the hot water they are still sufficient in size to permit brewing of a palatable beverage within a reasonable time, then the undesirable coffee grounds will escape into the liquid when the bag is first immersed, prior to the occurrence of the deformation of the pores or meshes above referred to. I have found that this difficulty is due in large measure to the filamentary character of the fabrics of which the bags of the prior art are in the main composed. As an example, when a woven cotton is employed, as is common in the case of tea bags, although the shape and size of the meshes or pores are well defined when the bag is dry, upon wetting of the bag by the hot water, the filaments of which the fibers of cotton are constructed become deformed, the ends branching out in random directions and bending and twisting in such a manner as to obstruct and at least partially close the meshes between the fibers. Thus a bag which is permeable to the essential oils and aroma ingredients of coffee when dry or immediately upon immersion in the hot water, shortly becomes relatively impermeable to these liquids and extremely fine solids so that the production of a suitable beverage requires an excessive time, if indeed it can be achieved at all. It is to be noted that materials now in use for the filtering of coffee in vacuum and drip type coffeemakers are unsuitable for coffee-brewing bags, for one reason or another.

By the present invention I have eliminated these defects which I have found in the attempts of the prior art to produce a satisfactory coffee-brewing bag. By the present invention there is provided a bag whose pore sizes remain reasonably constant under the conditions of steeping in boiling water, at least for the time required to make a desirably palatable coffee brew. Thus, the coffee-brewing bag of the present invention produces a savory and desirable coffee by immersion in hot water for a short period of time, comparable to the time required for brewing tea with tea bags.

Generally, I have overcome the difficulties which I have found to exist in the prior art by employing as the material of my coffee-brewing bag a non-woven fabric of regenerated cellulose fibers, preferably viscose, bonded into a unitary web or mat with regenerated cellulose, likewise preferably viscose. It will be understood that neither the material in and of itself nor the method of manufacture thereof constitutes any part of the invention, since such materials and methods are now well known, and the materials are commercially available. An example of such materials is the fabric manufactured by the Visking Corporation, of Chicago, Illinois, under the designation "Viskon."

For a clearer and more specific understanding of the invention reference is made to the attached drawing showing an illustrative embodiment of the invention, in which:

Fig. 1 is a view in perspective of a coffee-brewing bag made in accordance with the invention;

Fig. 2 is a vertical sectional view taken along the line 2—2 of Fig. 1, in the direction indicated by arrows; and Fig. 3 is a greatly magnified sectional view of the fabric of which the bag shown in Fig. 1 is composed, more or less schematically showing the microscopic structure of such fabric.

As illustrated in Figs. 1 and 2, it will be seen that the coffee-brewing bag of the invention is somewhat similar in appearance to a conventional tea bag. As illustrated, the coffee-brewing bag generally designated 8 comprises a rectangular sheet 10, of a fabric hereinafter to be described in greater detail, folded along its center line at 12, the abutting edges of the two folded portions of the fabric 10 being sealed together, as by stitching 14, to form a sealed envelope 16. If a glue or other adhesive is employed for sealing the envelope, it must be stable under exposure to boiling water. The envelope 16 is substantially filled with ground coffee 18 of the type commonly used in making coffee by conventional methods. A string 20 is attached to a corner of the envelope 16 for convenience in handling.

As stated above, it will be seen that, as thus far described, the coffee-brewing bag 8 is closely similar to a conventional tea bag, except for the substitution of coffee for tea leaves. However, I have found that, unlike the conditions which prevail in the case of tea, the nature and structure of the fabric employed for the envelope 16 are highly critical in the production of satisfactory coffee within a reasonable time upon steeping of the bag 8 in hot water.

I employ as the material of my envelope 16 a non-woven fabric comprising fibers 22 of regenerated cellulose, preferably viscose, bound in a matrix of non-fibrous regenerated cellulose 24, likewise preferably viscose. As is now well-known, such fabrics are formed by the coating, as by spraying, of the regenerated cellulose fibers with a viscose solution, and the subsequent in situ regeneration of the cellulose by well known methods to form a solid cohesive fabric having minute pores or voids 26 throughout the extent thereof. In the processes for manufacturing such regenerated cellulose fabrics, the fibers are generally disposed in one direction. However, there is sufficient irregularity in the orientation of the fibers 22 so that many of the fibers partially overlap and cross, thus forming a mesh structure or network having a large number of sizes of pores or meshes 26 therethrough. The coating or spraying of the regenerated cellulose mesh structure with the viscose solution is sufficient to bind (after the in situ regeneration of the cellulose) the overlapping and crossing and closely adjacent fibers into a solid and unitary fabric matrix, but the coating by spraying or otherwise is not carried beyond the point where the fabric remains highly porous.

I have found such a fabric to be highly advantageous as the material for my coffee-brewing bag because of the fact that, unlike cotton and similar materials, the all regenerated cellulose fabric retains substantially the same pore or mesh configuration under the time and temperature conditions of immersion in boiling water required to make a satisfactory brew, as it possesses when dry at room temperature. Thus, by the employment of such a fabric as the material of the envelope, I have avoided the defect which I have found to exist in prior coffee-brewing bags, the fact that ordinary fabrics such as cotton have their pores or meshes reduced in size upon the steeping in hot water, to an extent that desirable coffee extractives are prevented from passing through the bag and into the brew. By employing the fabric described above, as opposed to the fabrics heretofore employed in coffee-brewing bags, I provide an envelope for my coffee-brewing bag in which the pores or meshes, although sufficiently small to insure that coffee grounds of undesirable size cannot escape from the envelope when the bag is dry or is first steeped in the hot water, nevertheless remain of sufficient size during the entire brewing operation so that all of the essential oils and aromatic ingredients, including extremely fine and unobjectionable flavor ingredients of the coffee, may escape into the surrounding liquid in a short time.

As regards the sizes of the meshes or pores in the material, I have found that solid particles of coffee which are small enough to pass through a Tyler 100-mesh standard wire screen sieve (manufactured by W. S. Tyler Co., and in common use as a standard), if permitted to pass through the pores into the beverage, are considered by virtually all coffee drinkers to be unobjectionable. On the other hand, particles of coffee substantially larger than those retained on a Tyler 100-mesh standard sieve are generally considered to be objectionable and their presence is easily perceived by the person drinking the beverage. Accordingly, I employ a non-woven regenerated cellulose fabric as described above in which the pores or meshes are sufficiently small so that they will not pass particles which will be retained on a Tyler 100-mesh standard sieve. The pores or meshes in the fabric used in making the coffee bag of the present invention vary in size downwardly from those which will not pass particles retained on a Tyler 100-mesh standard sieve to those which will pass particles passed by a Tyler 300-mesh sieve. There are in the non-woven regenerated cellulose fabric a substantial number of pores which will pass particles passed by a Tyler 300-mesh standard sieve, and, in some such fabrics, a relatively small number of even smaller meshes. If all of the meshes are substantially smaller than a size corresponding to the openings in a Tyler 300-mesh standard sieve, it may be impossible, irrespective of time, to extract from the coffee-brewing bag into the brewed beverage all of the flavor-containing fine particles which some persons consider are required for a savory and satisfactory coffee.

One porous web or mat of non-woven viscose fibers held together by cellulose regenerated from viscose, in which the pores or meshes are sufficiently small to retain particles retained by a Tyler 100-mesh standard sieve, but in which many of the pores are sufficient in size to pass particles passed by a Tyler 300-mesh standard sieve, which I have found satisfactory is the fabric known as "Viskon," mentioned above.

As regards the fineness of the grinding of the coffee designated 18 in the drawing, I have found that when a material of the type described above is employed for the envelope 16, satisfactory and potable coffee may be made by employing any of the standard grinds in general use in the coffee industry. The standards for these grinds, as suggested by the Commodity Standards Division of the National Bureau of Standards, are: "regular," of which 33% is retained on a Tyler 14-mesh standard sieve, 55% is retained on a 28-mesh standard sieve, and 12% passes through a 28-mesh sieve; "drip," of which 7% is retained on a 14-mesh sieve, 73% on a 28-mesh sieve, and 20% passes through a 28-mesh sieve; and "fine" which entirely passes through a 14-mesh sieve, 70% being retained on a 28-mesh sieve, and 30% passing through a 28-mesh sieve. Any of these grinds may be used in my coffee-brewing bag. I have found that the brewing time is somewhat reduced by the use of "fine" grind; however, the use of this grind produces a somewhat higher influence of solid particles as compared with the water-soluble flavoring components in the brew, which some people find undesirable, although many others find the flavor and texture of such coffee extremely pleasing.

Obviously, the embodiment of the invention shown in the drawing is merely illustrative, and many applications of my invention other than that specifically illustrated will readily be devised by persons skilled in the art. Accordingly, the scope of my invention shall be deemed to be limited only by the appended claims.

I claim:

1. An article for use in brewing coffee comprising a sealed bag containing ground coffee, said bag comprising a non-woven fabric of viscose fibers bound together by cellulose regenerated from viscose and having pores of lesser size than the meshes of a Tyler 100-mesh standard sieve, some of said pores being of greater size than the meshes of a Tyler 300-mesh standard sieve.

2. An article for use in brewing coffee comprising a sealed bag containing ground coffee, said bag comprising a non-woven fabric of regenerated cellulose fibers bound together by regenerated cellulose and having pores of lesser size than the meshes of a Tyler 100-mesh standard sieve, some of said pores being of greater size than the meshes of a Tyler 300-mesh standard sieve.

3. An article for use in brewing coffee comprising a sealed bag containing ground coffee, said bag comprising a porous unwoven fabric of viscose fibers bound together by cellulose regenerated from viscose and having pores of lesser size than the meshes of a Tyler 100-mesh standard sieve.

4. An article for use in brewing coffee comprising a sealed bag containing ground coffee, said bag comprising an unwoven fabric of regenerated cellulose fibers impregnated with regenerated cellulose, having water-permeable pores therein of a size to retain particles retained by a Tyler 100-mesh standard sieve.

5. An article for use in brewing coffee comprising a sealed bag containing ground coffee, said bag comprising an unwoven fabric of viscose fibers bonded together with cellulose regenerated from viscose, having water-permeable pores therein of a size to retain particles retained by a Tyler 100-mesh standard sieve.

6. An article for use in brewing coffee comprising a sealed bag containing ground coffee, said bag comprising an unwoven fabric of viscose fibers bonded together with cellulose regenerated from viscose, having pores therein of a size to retain particles retained by a Tyler 100-mesh standard sieve, at least some of said pores being of a size to pass particles passed by a Tyler 300-mesh standard sieve.

7. An article for use in brewing coffee comprising a sealed bag containing ground coffee, said bag comprising an unwoven fabric of regenerated cellulose fibers bonded together with regenerated cellulose, having pores therein of a size to retain particles retained by a Tyler 100-mesh standard sieve, at least some of said pores being of a size to pass particles passed by a Tyler 300-mesh standard sieve.

8. An article for use in brewing coffee comprising a sealed bag containing ground coffee, said bag comprising a porous material consisting of cellulose regenerated from viscose, said material having pores of lesser size than the meshes of a Tyler 100-mesh standard sieve.

9. An article for use in brewing coffee comprising a sealed bag containing ground coffee, said bag comprising a porous material consisting of cellulose regenerated from viscose, said material having pores of lesser size than the meshes of a Tyler 100-mesh standard sieve, some of said pores being of greater size than the meshes of a Tyler 300-mesh standard sieve.

LEON H. ABRAHAMS.

REFERENCES CITED

The following references are of record in the file of this patent:

UNITED STATES PATENTS

| Number | Name | Date |
| --- | --- | --- |
| 1,247,906 | Tully | Nov. 27, 1917 |
| 1,489,807 | Anderson | Apr. 8, 1924 |
| 1,876,474 | Starkey | Sept. 6, 1932 |
| 1,894,345 | Cooper | Jan. 17, 1933 |
| 1,947,523 | Hirschhorn | Feb. 20, 1934 |